United States Patent [19]

Smith et al.

[11] 4,027,109

[45] May 31, 1977

[54] TELEPHONE CALL DIVERTING SYSTEM

[76] Inventors: Lloyd M. Smith; Robert E. Webb, both of 2830 Clearview Place, Atlanta, Ga. 30340

[22] Filed: June 27, 1975

[21] Appl. No.: 591,026

[52] U.S. Cl. .................... 179/18 BE; 179/18 FA; 179/84 R

[51] Int. Cl.² ........................................ H04M 3/54

[58] Field of Search ....... 179/18 BE, 18 BD, 1 SW, 179/1 VC, 84 R, 84 VF, 84 A, 16 A, 16 AA, 18 F, 18 FA, 81 R, 81 A, 27 F

[56] References Cited

UNITED STATES PATENTS

| | | | |
|---|---|---|---|
| 3,622,709 | 11/1971 | Tjaden | 179/18 FA |
| 3,704,346 | 11/1972 | Smith et al. | 179/18 BE |
| 3,777,067 | 12/1973 | Kilby | 179/81 R |
| 3,798,382 | 3/1974 | Hoven | 179/81 R |

Primary Examiner—Thomas A. Robinson

[57] ABSTRACT

A system for receiving incoming telephone calls on an incoming telephone line and automatically diverting such incoming calls to an outgoing telephone line. The disclosed call diverting system includes a disconnect circuit which automatically disconnects the incoming-call line in response to predetermined conditions indicating that the diverting call has been completed and the calling party has hung up. The disclosed system also includes a call divert control function which informs the called party on the outgoing line that he is receiving a diverted call, and which enables the called party to control the voice-bridging interconnection between the line and the calling party on the incoming line.

9 Claims, 2 Drawing Figures

TELEPHONE CALL DIVERTING SYSTEM

This invention relates in general to telephone call diverting equipment, and in particular to telephone call diverting equipment of the type wherein an incoming call from a calling party on a first or "incoming" telephone line is automatically diverted on a second or "outgoing" telephone line to the called party.

Telephone call diverting equipment and systems of various kinds are used to establish a temporary two-way speech path interconnection between at least two telephone lines, so that a party who has become connected through central office switching equipment to a first line associated with the call diverter can communicate with another party who has established connection to a second line also associated with the call diverter through central office switching equipment. While call diverting equipment in its simplest form consists of interconnecting switches for bridging between two lines, more sophisticated diverting equipment is available which, in response to the presence of a ringing signal denoting an incoming call on a first line, automatically dials a predetermined number on a second or outgoing line and establishes a two-way audio interconnection between the two lines. Such call diverting equipment may be used, for example, to divert business calls from a user's office to his home, to another office, or to any other location accessible to a telephone. Automatic telephone call diverting equipment generally includes a provision for changing the subscriber number to which incoming calls are diverted, and some diverting systems allow the divert subscriber number to be remotely programmed into the system. An example of one telephone call diverting system is shown in U.S. Pat. No. 3,704,346, issued Nov. 28, 1972.

Since automatic telephone call diverting equipment typically operates without an attendant, such equipment must include some provision for disconnecting both the incoming line and the outgoing line upon completion of the call by both the calling party and the called party. Since dial tone is usually returned to telephone lines by the central office equipment in response to the lines going on-hook, call termination has generally been detected in prior art call diverting equipment by a suitable dial tone detect circuit. While such dial tone-responsive disconnect circuits are suitable for many locations, some types of telephone lines never provide a dial tone which is presented to the diverting equipment. For example, "in-WATS" lines are used only for toll-free dialing to the line subscriber. Since in-WATS lines are never used to initiate a call outgoing from the subscriber location (where the call diverting equipment would normally be installed), the termination of an incoming call on such a line would never be signaled by the return of dial tone to that line. Thus, a previously-established call diversion involving an in-WATS line could remain unbroken even though both parties had hung up, with the result that the in-WATS line and the call diverter would be unavailable for subsequent use.

The problem of call nontermination is particularly troublesome in situations where the diverted call is uncompleted, such as by the presence of a busy signal or unanswered ringback signals on the outgoing telephone line. The party who placed the call on an incoming in-WATS line will, after a time, hang up his telephone but the call diverting equipment of the prior art has no way of knowing this fact. While it has been proposed to design calling-party disconnect circuits which will detect ringback or busy-back conditions on the outgoing line, there tends to be considerable variance in the amplitude and other parameters of ringback and busyback signals; circuits which can accommodate such signal variations while successfully performing the desired disconnect function are complex and relatively expensive.

Another problem encountered with telephone call diverting equipment of the prior art results from asynchronous interconnection of the incoming and outgoing lines, that is, by interconnecting those two lines at a time which is not controllable by the called party who answers the outgoing line (and is the intended recipient of the call that was placed on the incoming line). Line interconnection in conventional call diverting equipment typically occurs as soon as dial-out on the outgoing line is completed. This means that the person who placed a call on the incoming line first hears the normal ringback associated with his call, followed by a second and usually weaker ringback signal from the out-dialed call on the outgoing line. These two sequentially-occurring ringbacks, along with switching noises or other transients caused by outdialing or by establishing the interconnection between incoming and outgoing lines, lets the calling party know that his call is not receiving routine treatment and, in fact, he may even hang up under the misapprehension that his call is somehow going astray.

A further problem resulting from asynchronous interconnection in call diverting equipment is that the person who answers the telephone which was automatically dialed by the call diverter cannot know, when he first picks up the telephone, whether the call is a diverted call or is simply a normal call made directly to that telephone. Accordingly, the person answering the outgoing-line telephone can never be certain whether or not to answer with his business or professional greeting, or whether to use a more familiar salutation. Since diverted calls are frequently diverted from a person's office to his home telephone, moreover, the person answering a diverted business call may be a child or someone else who is ill-prepared to effectively handle a business or professional call.

Stated in general terms, the present invention provides a telephone call diverting system in which the respective signal levels on the incoming and outgoing lines are compared, with a previously-established divert interconnection being automatically terminated when a predetermined condition of relative line signal amplitudes is detected. Stated more particularly, the call diverting interconnection is disconnected when the signal level on the incoming line is less than the signal level on the outgoing line, which is assumed to be an indication that the calling party on the incoming line has hung up. The call diverting control of the present invention places a characteristic signal on the outgoing line only, advising the person who answers the outgoing line that a divertable call awaits. That person then speaks a particular key word into his telephone, so that the signal received back from the outgoing line by the present diverting system causes the divert interconnection to be established.

Accordingly, it is an object of the present invention to provide an improved telephone call diverting system.

It is another object of the present invention to provide telephone call diverting equipment which disconnects diverted call interconnection under predetermined conditions, irrespective of a dial tone signal.

It is still another object of the present invention to provide telephone call diverting equipment in which the called party who receives the diverted call can control the actual interconnection of his line with the calling party.

Other objects and advantages of the present invention will become more readily apparent from the preferred illustrative embodiment thereof, including the drawings in which.

Figure 1:
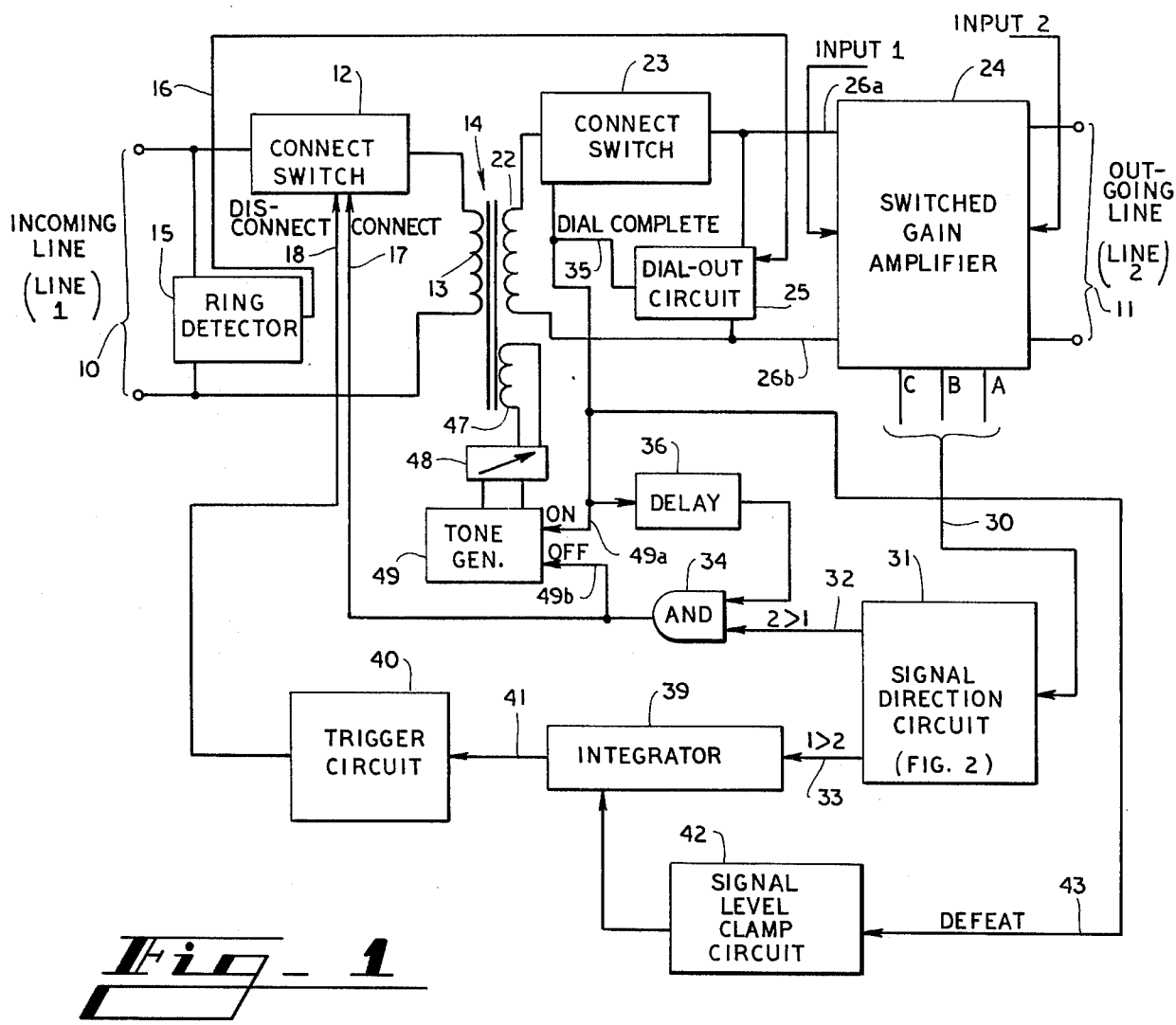
FIG. 1 shows a block schematic diagram of a call diverting system according to the illustrative embodiment of the present invention.

Turning to the call diverting system shown generally in FIG. 1, it is assumed that a first or "incoming" telephone line is connected to the incoming line terminals 10 and that a second or "outgoing" telephone line is connected to the outgoing line circuit terminals 11. Each of the incoming and outgoing lines may be a conventional telephone line interconnected with standard telco central office equipment. Alternatively, the incoming line may be an in-WATS line and/or the outgoing line may be an out-WATS line.

The incoming circuit terminals 10 are connected through the incoming line connect switch 12 and a first winding 13 of the audio coupling transformer 14. A ring detector 15 is connected across the incoming circuit terminals 10, and the ring detector functions to provide an output signal on the ring line 16 in response to the presence of a ringing signal applied to the incoming circuit terminal 10 by telco central office equipment or the like. The line connect switch 12 may be a relay or any other suitable switching device which is selectively operative, in response to signal conditions applied on the connect line 17 and the disconnect line 18, to respectively connect and disconnect the incoming circuit terminals 10 with the first winding 13 of transformer 14. It will be understood, for example, that a conventional flip-flop can be connected to receive signals on the connect line and the disconnect, and to actuate the switch 12.

The transformer 14 includes a second winding 22 which is connected through the outgoing line connect switch 23 and the line 26a to the "input 1" side of the switched gain amplifier 24. The "input 2" side of the switched gain amplifier 24 is connected to the outgoing circuit terminals 11. A dial-out circuit 25 is connected across the lines 26a and 26b connected to the "input 1" side of the switched gain amplifier. The dial-out circuit 25 is operative to provide dial pulse signal conditions across the lines 26a and 26b, in response to preprogrammed input information pertaining to a predesired telephone number to which calls arriving on the incoming lines are to be diverted onto the outgoing line. The design and construction of programmable dial-out circuits is known to those skilled in the art, and one example of such circuits is disclosed in the aforementioned U.S. Pat. No. 3,704,346. The dial-out circuit 25 places a predetermined signal condition on the line 35 when dial-out is completed.

The switched gain amplifier 24 is a form of bidirectional amplifier, known in the art, which receives and amplifies signals which are applied to either of two inputs, and passes on those amplified signals to the other of the two inputs. For example, a signal appearing on input 1 of the switched gain amplifier is amplified and supplied as an output signal to input 2 of that amplifier; an input signal appearing on input 2 of the switched gain amplifier is, conversely, amplified and supplied as an output signal on input 1 of the amplifier. Such amplifiers, while providing signal amplification in a particular direction, correspondingly attenuate signals of relatively lower amplitude coming from the other direction so that the amplifier will not become self-oscillating. An example of a switched gain amplifier used in an actual embodiment of the present invention is manufactured by the Lorain Company and identified by Model No. VRM407.

The switched gain amplifier 24 provides three voltage points A, B, C, and the voltage relationships at the voltage points is determined by the relative amplitude of signals applied to the first and second inputs of the amplifier. In the illustrative embodiments, the following signal conditions and voltages are present:

| Signal Condition | Voltage |
|---|---|
| No signal (input 1 = input 2 = 0) | A+B=C |
| Input 1>Input 2 | A+B>C |
| Input 2>Input 1 | A+B<C |

The three voltage points A, B, and C, collectively indicated by the line 30, are supplied to the signal direction circuit 31 which is described below in further detail. The signal direction circuit 31 provides a certain output signal condition on the line 32 when the signal amplitude received from the outgoing line terminals 11 by the switched gain amplifier 24 exceeds the signal received by that amplifier from its input 1, which corresponds to a condition in which the direction of signals passing through the call diverting apparatus is from the outgoing line and toward the incoming line. When the direction of signals passing through the switched gain amplifier 24 is in the opposite direction, namely, coming from the incoming line and going to the outgoing line, then the signal level of input 1 exceeds the signal level of input 2 as denoted by a predetermined signal condition on the output line 33 of the signal direction circuit 31.

Output line 32 from the signal direction circuit 31 is supplied to one input of the AND gate 34, while the second input to the AND gate 34 is connected to the dial-completion 35 of the dial-out circuit 25, by way of the delay circuit 36. The output of the AND gate 34 goes to the connect signal line 17 going to the incoming line connect switch 12, and also to the "off" input 49b of the tone generator 49.

The output line 33 of the signal direction circuit 31 is supplied to an integrator circuit 39, the output of which goes to a trigger circuit 40 which may function in the manner of the well-known Schmitt trigger to provide an output pulse on the disconnect line 18 in response to an appropriate predetermined input signal condition. The signal level on the line 41 connecting the integrator circuit 39 to the trigger circuit 40 is selectively clamped at a predetermined level by the signal level clamp circuit 42, and the clamping operation provided by that circuit is selectively defeated by the presence of the dial completion signal supplied to the clamp circuit along the line 43.

The coupling transformer 14 has a third winding 47 which is connected through a signal level adjusting circuit 48 to receive the output of the tone generator 49. The tone generator 49 is turned on in response to the dial-completion signal appearing on the input 49a, and is turned off by an output signal condition from the AND gate 45 applied to the input 49b. It will be understood that the tone generator 49 may include bistable switching device, such as a flip-flop, which is responsive to signals appearing on the inputs 49a and 49b to turn the tone generator on and off. Alternative constructions will suggest themselves to those skilled in the art.

The operation of the illustrative embodiments shown in FIG. 1 is now discussed with reference to a line disconnect situation in which it is assumed that a circuit is already established through the incoming line, the incoming circuit terminals 10 and the incoming line connect switch 12, the transformer 14, the outgoing line connect switch 23, the switched gain amplifier 24 to the outgoing circuit terminals 11, and the outgoing line connected thereto. Assuming that a normal two-party conversation is in progress, between a first party on the incoming line and a second party on the outgoing line, the audio signals appearing only on the incoming line from time to time will cause the signal direction circuit 31 to provide output signals on the line 33, indicating that the signal level on input 1 of the switched gain amplifier is greater than on input 2 thereof. These signals on line 33 are integrated in 39. The signal level clamp circuit 42 is presently disabled by the dial-completion signal on the defeat line 43, so that only integrator circuit 39 maintains the signal level on the line 41 above the threshold level below which the trigger circuit 40 fires to apply a disconnect signal on the line 18. Assuming that no audio signals are present on the incoming line for a predetermined period of time, however, the integrator circuit 39 receives no input signals from the line 33 and the output of the integrator circuit gradually decays to a level which allows the trigger circuit 40 to fire and send a signal pulse along the line 18 to disconnect the switch 12. The incoming line is thus automatically disconnected from the call divert system.

The operation of the illustrative embodiment is now discussed with respect to the controlled interconnection of the incoming and outgoing line to complete a divert condition. Assuming that a calling party on the incoming line has dialed the subscriber number associated with that line, the ringing signal present on the incoming circuit terminals 10 is applied to the ring detector 15. A ringing signal is applied on the ring line 16 to the dial-out circuit 25, which commences to outpulse dialing pulses (or multi-frequency tone signals) which are applied to the outgoing circuit terminal 11 and the outgoing line. Since the incoming line connect switch 12 remains open at this time, however, the party calling on the incoming line will hear only the regular ringback signal supplied from the telco central office.

As soon as the dial-out circuit 25 completes its task, a signal appears on the line 35 to turn on the outgoing line connect switch 23 and also to turn on the tone generator 49. The dial completion signal is also supplied to the signal level clamp circuit 42 as aforementioned. The tone generator 49 now supplies an audio tone signal to the third winding 47 of the transformer 14, with the result that the tone signal is supplied through the second winding 22 of that transformer and through the now-closed outgoing line connect switch 23 to be applied to the outgoing line. The incoming line connect switch still remains open, however, and so the party calling on that line still hears only the telco-supplied ringback signal. The tone signal provides a bias on the amplifier 24 in the "input 1 > input 2" sense, at this time.

The signal level clamp circuit 42 maintains the integrator 39 output to the trigger circuit 40 clamped at a level which positively prevents the occurrence of a disconnect signal, until operation of the dial-out circuit 25 is complete, so that the integrator output commences to decay only after dial-out of the called party on the output line is completed.

As soon as the party called on the outgoing line by the dial-out circuit 25 answers the telephone, he is immediately informed by the presence of the tone signal on that line that he has received a diverted call, rather than a conventional call directly dialed to that number by another calling party. At this time, the person who answered the outgoing line speaks a "key word" into his telephone. The amplitude of this key word, which is received on input 2 of the switched gain amplifier 24, is sufficient to overcome the "input 1 > input 2" bias which previously existed on the amplifier because of the signal applied from the tone generator to input 1. As a consequence, the signal direction circuit 31 applies a signal on line 32 through the AND gate 34, which is now gated on by time-out of the delay circuit 36, so that the tone generator is shut off and a connect signal is simultaneously applied to the incoming line connect switch 12. The party calling on the incoming line is, for the first time, now interconnected with the outgoing line, and this interconnection is signaled to the called party on the outgoing line by the disappearance of the tone signal. The called party can then speak any desired salutation, knowing that this salutation will be the first thing heard by the calling party after regular ringback. The interconnection between incoming and outgoing lines continues until disconnected as aforementioned, or until terminated or disconnected by any alternative arrangement.

Although the illustrative embodiment of the present invention is described in the context of a call diverting system which includes both disconnect apparatus and called party-controlled diverting apparatus, it should be apparent that either such apparatus can be provided independently of the other, in alternative constructions of call diverting systems.

Figure 2:
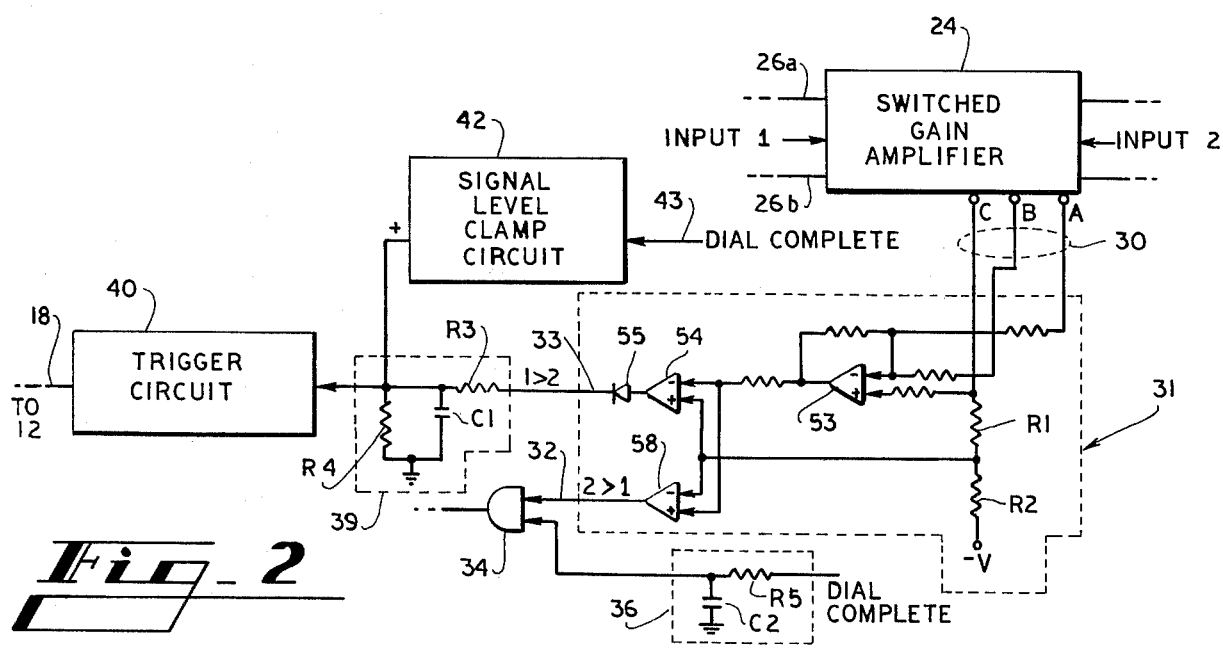
FIG. 2 shows a schematic diagram of a signal direction circuit according to the illustrative embodiment.

The signal direction circuit 31 is shown in detail in FIG. 2 along with certain related components previously shown on FIG. 1. Since the voltage points A, B, C of the switched gain amplifier 24 exhibit the foregoing relationship depending on the relative signal conditions applied to the amplifier, the signal direction circuit provides the necessary output signal levels on the output lines 32 and 33 by summing the voltage signals on lines A and B, and comparing that sum with the signal level on line C. Voltage points A and B are connected in summing relation to the inverting input of the operational amplifier 53, whereat the sum of the voltages A and B are compared with the voltage C and a reference level set by resistances R1 and R2. If $A + B > C$, then the output of the operational amplifier 53 goes low. If the output of operational amplifier 53 goes low, compared to the C voltage applied as a reference input to the comparator 54, then the output of the comparator 54 goes high. The output of the comparator 54 is supplied through the diode 55 to the output line 33, and then to the integrator circuit 39 consisting of the resistance R3 and the capacitance C1. Each high-going output from the comparator 54 thus functions to charge capacitance C1.

Referring back to the above-described disconnect function, the absence of the dial-completion signal applied on the line 43 to the signal level clamp circuit 42 allows the capacitance C1 to receive a charging voltage from the clamp to remain charged to a level which prevents the trigger circuit 40 from firing. As soon as the dial-completion is received, however, the clamping voltage is removed from C1 and that capacitance commences to discharge through parallel resistance R4. The time constant of R4-C1 is selected so that a substantial length of time, in the order of 30–40 seconds in an actual embodiment of the present invention, is required for the capacitance C1 to discharge to a level which allows the trigger circuit 40 to fire and provide a disconnect signal.

Assuming that an interconnection circuit has been established between the incoming and outgoing lines, each occurrence of voice signals on the incoming line will provide the aforementioned high-going signal on line 33 from the signal direction circuit, causing the capacitance C1 to receive an increment of charge. Resistance R3 in series with C1 and line 33 limits the charge rate of C1 from line 33, so that the capacitance charges with a time constant of R3-C1 which is preferably selected so that normal line noise signals appearing on the incoming line will not prevent C1 from discharging. Voice signals present on the incoming line will, however, have sufficient energy to keep C1 charged, thus preventing an unwanted disconnection of the incoming line.

The signal directing circuit 31 provides a high signal condition on the line 32, indicating that the signal level received from the outgoing line is greater than the signal level from the incoming line, by the comparator 58 which receives the output from the operational amplifier 53 as well as the aforementioned reference level signal provided by C, R1, and R2. The output of comparator 58 thus goes high when the above-mentioned key word is spoken by the called party on the output line. The AND gate 34 has been previously enabled by the delayed application of the dial-completion signal so that the AND gate 34 can now provide the signal condition which turns off the tone generator and connects the incoming line in the previously described manner. The delay circuit 36, which in the disclosed embodiment is provided by the simple integrator circuit including capacitance C2 and resistance R5, keeps the AND gate 34 disabled for a brief period of time after dial-out is completed, so that switching noises appearing at that time on the outgoing line from the associated telco central office will not prematurely interconnect the two lines.

The aforementioned "key word" which enables the called party to control the divert interconnection can be any word which, when spoken by the called party, has sufficient duration to overcome the bias applied to the amplifier 24 by the tone signal into input 1 of that amplifier; one convenient key word is the word "divert", although other such words will undoubtedly suggest themselves. It will be apparent that the duration required of a key word is determined by circuit component values of the system, and that it is well within the skill of the art to design a system so that a word or other spoken command of substantially longer duration is required to trigger the divert interconnection. Moreover, it will be apparent that a more sophisticated divert command system could be employed which requires positive word-identification means, forming no part of the present invention, so that a specific spoken key word would be required to control the divert function.

With a called party divert control according to the present invention, it has been found that a system designed for interconnect operation by a single key word, such as "divert" will also establish divert interconnection in response to a busy signal received from the output line, indicating that the called party's line is presently busy. The calling party will then be interconnected to the output line to hear the busy signal thereon, so that the calling party knows why his call was not completed. While normal busy signals returning on the output line will have sufficient amplitude to trigger the divert interconnection of the present invention, the normal ringback signals are not of sufficient amplitude to trigger the divert interconnect. If no one answers the output line, accordingly, the calling party on the input line will simply receive normal ringback signals applied to that line and his call will go uncompleted. In the case of a toll call, or local message-unit or pay phone call, accordingly, the calling party will not be charged for placing a call if no one answers the called telephone.

It will be understood that the foregoing relates to only an illustrative embodiment of the present invention, and that numerous changes and modifications may be made therein without departing from the spirit and the scope of the invention as defined in the following claims.

We claim:

1. Apparatus for selectively disconnecting a circuit connection which bridges two lines, comprising:
   a first line circuit operatively connected to one of said lines;
   a second line circuit operatively connected to the other of said lines;
   at least the first said line circuit including switching means selectively operative to establish an interconnecting circuit between said two line circuits;
   means responsive to the levels of incoming signals on each of said two line circuits to provide a disconnect signal condition only when the level of incoming signals on one of said line circuits exceeds the level of incoming signals on the other said line circuit; and
   said switching means being responsive to said disconnect signal condition to terminate a previously established interconnecting circuit between said two line circuits.

2. Apparatus as in claim 1, further comprising means responsive to the occurrence of said disconnect signal condition for a predetermined minimum time to terminate said previously established interconnecting circuit only upon completion of said minimum time.

3. Apparatus as in claim 1, wherein said signal level responsive means is operative to provide said disconnect signal condition only when the level of incoming signals on the said second line circuit exceeds the level of incoming signals on the said first line circuit.

4. Apparatus as in claim 3, wherein said signal level responsive means comprises a capacitance connected to receive a charge signal when the level of incoming signals on said first line circuit exceeds the level of incoming signals on said second line circuit, means responsive to discharge said capacitance at a controlled rate, and means responsive to the level of charge on said capacitance to provide said disconnect signal condition when said charge falls below a certain level.

5. Apparatus as in claim 1, further comprising:
means responsive to the establishment of said interconnecting circuit to provide a connection signal condition; and
means responsive to said connection signal condition to inhibit the termination of an interconnecting circuit until at least a predetermined time after said connection signal condition is first provided.

6. Apparatus for selectively establishing a circuit interconnection between two lines, comprising:
a first line circuit operatively connected to one of the lines;
a second line circuit operatively connected to the other of said two lines;
switch means in said first line circuit selectively operative to connect said first line circuit to said second line circuit;
means responsive to a calling signal condition on said first line to initiate an outgoing call condition on said second line;
control means responsive to the occurrence of a predetermined audio signal condition incoming on said second line circuit to provide a switching signal condition; and
said switch means being operative in response to said switching signal condition to connect said first line circuit to said second line circuit.

7. Apparatus as in claim 6, further comprising:
means operative to apply an audio signal condition only to the second one of said line circuits when said outgoing call condition is on said second line; and
means responsive to said switching signal condition to remove said audio signal condition from said second line circuit.

8. Apparatus as in claim 7, wherein:
said control means includes means responsive to the level of incoming signals on said second line circuit and also responsive to the level of said audio signal condition applied to said second line circuit to provide said switching signal condition only when the level of said incoming audio signal on said second line circuit exceeds the level of said audio signal condition applied to said second line circuit.

9. Apparatus as in claim 6, further comprising:
means responsive to the levels of incoming signals on each of said line circuits to provide a disconnect signal condition only when the level of incoming signals on said second line circuit exceeds the level of incoming signals on the first line circuit; and
said switch means in said first line circuit being responsive to said disconnect signal condition to disconnect said first line circuit from said second line circuit.

* * * * *